(12) United States Patent
Verbesselt et al.

(10) Patent No.: US 6,771,658 B1
(45) Date of Patent: Aug. 3, 2004

(54) SIGNALLING BETWEEN ATM AND LOCAL AREA NETWORKS

(75) Inventors: Ivan Verbesselt, Londerzeel (BE); Geert Heyninck, Deurne (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/206,290

(22) Filed: Dec. 7, 1998

(30) Foreign Application Priority Data

Dec. 8, 1997 (EP) .............................. 97402970

(51) Int. Cl.$^7$ ............................ H04J 3/16; H04J 3/22
(52) U.S. Cl. ................. 370/466; 370/395.1; 370/410
(58) Field of Search .................. 370/351, 352–356, 370/410, 465–468, 426, 395.5, 395.51, 395.52, 395.53, 395.1

(56) References Cited

U.S. PATENT DOCUMENTS

| | | | |
|---|---|---|---|
| 5,528,590 A | | 6/1996 | Iidaka et al. |
| 5,835,710 A | * | 11/1998 | Nagami ...................... 370/351 |
| 5,872,786 A | * | 2/1999 | Shobatake .................. 370/398 |
| 6,125,123 A | * | 9/2000 | Furuno ....................... 370/467 |
| 6,147,989 A | * | 11/2000 | Esaki et al. ................. 370/355 |
| 6,343,322 B2 | * | 1/2002 | Nagami et al. ............. 709/227 |

OTHER PUBLICATIONS

R. Jeffries, "ATM Lan Emulation: The Inside Story the ATM Forum's Lan Emulation Service Makes it Possible to Ship Upper–Layer Protocols Over ATM Connections Without Modifying Legacy Software", Data Communications, vol. 23, No. 13, Sep. 21, 1994, pp. 95–98, 100.

A. Chugo et al, "Boradband Communication Network Architecture for Distributed Computing Environments", IEICE Transaction on Communications, vol. E77–B, No. 3, Mar. 1, 1994, pp. 343–350.

H. Esaki et al, "Datagram Delivery in an ATM–Internet", IEICE Transactions on Communications, vol. E77B, No. 3,, Mar. 1, 1994, p. 314–326.

* cited by examiner

*Primary Examiner*—Ajit Patel
(74) *Attorney, Agent, or Firm*—Sughrue Mion, PLLC

(57) ABSTRACT

A method is described for setting up or releasing a connection between a first terminal connected to a local area network and a second terminal connected to an ATM network, both networks being intercoupled by means of a network termination apparatus. The signalling functionality is performed within a predetermined terminal connected to the local area network in stead of within the network termination apparatus, which merely converts and transfers the ATM signalling protocol messages into LAN messages for delivery to the predetermined terminal and vice-versa. The invention also relates to such a predetermined terminal, a network termination apparatus and a terminal to be connected to a local area network, for performing the above described methods and some variants.

26 Claims, 4 Drawing Sheets

SIGNALLING BETWEEN ATM AND LOCAL AREA NETWORKS

BACKGROUND OF THE INVENTION

The present invention relates to a method for setting up or releasing a connection between a first terminal connected to a local area network and a second terminal connected to an asynchronous time division multiplexing network, hereafter abbreviated by and referred to as ATM-network, both networks being intercoupled by means of a network termination apparatus, as is further described in the non-characteristic part of claims 1,2 and 8, whereby these respective claims refer to the method either being initiated from the network termination apparatus, or from a terminal connected to the local area network or the ATM network.

The present invention also relates to a first terminal for being connected to a local area network as is described by the non-characteristic part of claim 13, to a predetermined terminal for being connected to a local area network as is referred to by the non-characteristic part of claim 14 and to a network termination apparatus for being coupled between this ATM network and this local area network, as is further described in the non-characteristic part of claims 23 and 26, for realising the respective above mentioned variants of the method.

Such a method, as well as such a network termination apparatus, are already known in the art, e.g. from the "U.S. Pat. No. 5,528,590: ATM-UNI-LAN Communication method and apparatus". Therein, a method of communication between an ATM-UNI ATM network and a local area network, abbreviated by LAN, is presented, whereby in case of data transmission from the LAN side towards the ATM-UNI, reference is made in column 1, line 35 to a connection request generated upon arrival of a data frame from a LAN terminal, requesting a controller within a communication apparatus for a connection. This prior art communication apparatus corresponds to the network termination apparatus referred to in the introductory part of claims 1,2,8,13,14 and 23 and 26 of this invention. Although not explicitly mentioned in the prior art document, this connection request is generated within the communication apparatus, since it is based upon incoming data frames transmitted from a LAN terminal to that communication apparatus. For prior art connections to be set up from a terminal connected to the ATM network to a terminal connected to the LAN network, in the prior art document a call set-up request from the ATM-UNI network is transmitted towards this communication apparatus and as well applied to the controller of this communication apparatus as is mentioned in column 1, lines 41–42. The prior art communication apparatus, includes, besides the controller, also a control unit, which operate in association with each other, to perform call processing, as stated in column 5, lines 55–60. This means that they perform the necessary signalling function for setting up the connection with the terminal connected to the ATM network. In either case, for connections to be set up from the LAN side towards the ATM or vice-versa, the prior art communication apparatus, corresponding to the network termination apparatus referenced to in the introductory part of claims 1,2,8,13,14,23 and 26, thus needs to include the necessary processing devices for terminating an ATM signalling protocol. Similarly, for releasing a connection between a terminal connected to the LAN network and a terminal connected to the ATM network, the communication apparatus of the prior art, corresponding to the network termination apparatus, also needs to perform the ATM signalling protocol for releasing this connection.

Since such a network termination apparatus is physically located at the customer's premise, cost and maintenance are important, which in case of the prior art solution, might become an issue. Therefore a method is needed whereby the complexity and consequently the cost and maintenance cost, of the network termination apparatus is reduced.

SUMMARY OF THE INVENTION

An object of the present invention is therefore to provide a method for setting up or respectively releasing a connection between a terminal connected to one network type, local area or ATM, and another terminal connected to the other network type, as well as a network termination apparatus intercoupling both networks, of the above known type, but whereby the complexity of this network termination apparatus is significantly reduced with respect to the prior art solution.

According to the invention, this object is achieved due to the fact that said method is further realised as is described in the characteristic parts of respective claims 1,2 and 8, that a predetermined terminal coupled to said local area network, is further adapted in accordance to claim 14, that the network termination apparatus is further adapted in accordance to claims 23 and 26 and that, for the method initiated from the local area network side as is described in claim 2, a first terminal coupled to said local area network is further adapted in accordance to claim 13.

In this way, a connection set-up request message or a connection release request message, generated by said network termination apparatus for requesting to set up or to release a connection between a first terminal connected to the local area network and a second terminal connected to the ATM network, is now no longer directed towards a controller within the network termination apparatus, but towards a predetermined terminal, connected to the local area network and which is adapted to terminate an ATM signalling protocol, as is explained in claims 1 and 23. As a result, the complexity and consequently, the cost of the network termination apparatus is significantly reduced.

In a variant of the method, the first terminal is itself adapted to generate this request for setting up or for releasing this connection, and to transmit its own generated LAN connection set-up or release request message towards said predetermined terminal, as is explained in claims 2 and 13. Again in this case the network termination apparatus can be kept simple.

Similarly, signalling protocol messages, transmitted from the ATM network for setting up or releasing a connection between a second terminal connected to the ATM network and a first terminal connected to the local area network, are no longer terminated within the network termination apparatus, but are merely converted in this apparatus into corresponding local area network messages which are then consecutively transferred towards the predetermined terminal connected to the local area network, adapted for terminating the some ATM signalling protocol, as is explained in method claim 8 and network termination arrangement claim 26. Upon receipt of these local area network messages consisting of converted ATM signalling protocol messages, this predetermined terminal will in its turn send adequate ATM messages for performing the signalling protocol, back to the network termination apparatus.

In each case, the ATM signalling protocol termination is performed in this predetermined terminal at the local area network side, as is stated in claim 14, thereby omitting the necessary processing devices for terminating an ATM signalling protocol in the network termination apparatus, thus seriously reducing the complexity of this apparatus, and consequently the cost and maintenance of it. A second conversion means for converting back and forth between ATM messages and local area network message, and for distinguishing between incoming ATM messages these ATM messages pertaining to an ATM signalling protocol, was already included and described in the prior art network adaptation apparatus. Therefore an extra functionality required in the network adaptation apparatus with respect to the prior art, is the conversion of these distinguished ATM signalling protocol messages into corresponding local area network messages, for further transmission towards the predetermined terminal, as is stated by claim 26. This added functional step hardly requires extra hardware or processing power. In case the request is generated in the network termination apparatus itself, as was the case in the prior art arrangement, this request is now to be generated as a local area network message, and to be directed towards the predetermined terminal, in stead of internally being handled within the network termination apparatus. This is explained in claim 23, these steps again requiring little additional hardware or processing power.

On the other hand, a predetermined terminal connected to the local area network, needs to be equipped for performing the ATM signalling protocol termination, as stated by claim 14. Since however, at the time of the invention, the majority of all terminals connected to any local area network, are already equipped with very powerful processing devices, the step of upgrading a predetermined one of them with an ATM signalling protocol termination functionality, represents much less impact on the hardware, compared to the processing power that is necessary for implementing this function in the network termination apparatus. Indeed, the already available processing power in one of these LAN terminals can be used or shared for performing this function. Only a small software module containing the necessary instructions for addressing and triggering the processor for performing this functionality is needed. On the contrary, as already mentioned, implementing the ATM protocol signalling termination functionality in the network termination apparatus, not only requires such a software module but also the processing devices to be installed, thus presenting a much higher cost compared to the solution of the invention which makes use of already installed processing power in local area network terminals.

Another characteristic feature of the present invention is that as an alternative, also the predetermined terminal itself can take the initiative for setting up or releasing a call with a terminal at the ATM side, as is explicitly indicated by claims 3, 16 and 24, or that this terminal may as well be the one to which an ATM terminal wants to set-up a connection or release an existing connection with, as is mentioned by claim 9 and claim 25.

Yet another characteristic feature of the present invention is described method claims 4 and 11, whereby said predetermined terminal is further adapted as is described in claim 19 and whereby said network termination apparatus is further adapted as is described in claim 25.

In this way, since the ATM signalling protocol means included within the predetermined terminal generates ATM messages, which cannot be properly transmitted on a legacy LAN interface means of a local area network, this predetermined terminal includes a first conversion means adapted for converting the ATM messages of the ATM signalling protocol into corresponding legacy LAN messages or LAN frames, and for further transmitting them towards the network termination apparatus.

On the other hand, the network termination apparatus is also to be adapted to distinguish between incoming local area messages, these that are converted ATM signalling protocol messages, for then reconverting them into the original ATM signalling protocol messages for transmission towards the ATM network, as is stated in claim 25.

Yet another characteristic feature of the present invention is mentioned in method claims 6 and 10, whereby the predetermined terminal is further adapted as is described in claims 20 to 22.

In this way, incoming local area network messages consisting of converted ATM signalling protocol messages are re-converted by the first conversion means into the original ATM signalling protocol messages, for further forwarding to the ATM signalling protocol means within the predetermined terminal.

In some embodiments, as will be explained more into detail in the descriptive part of this document, the predetermined terminal includes a demultiplexer means since some of the incoming local area messages, such as for instance the connection set-up or release request messages, are directly transmitted towards the ATM signalling protocol means, whereas returning messages of the signalling protocol, in local area network format, in some variants of the method, first have to be directed towards the first conversion means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
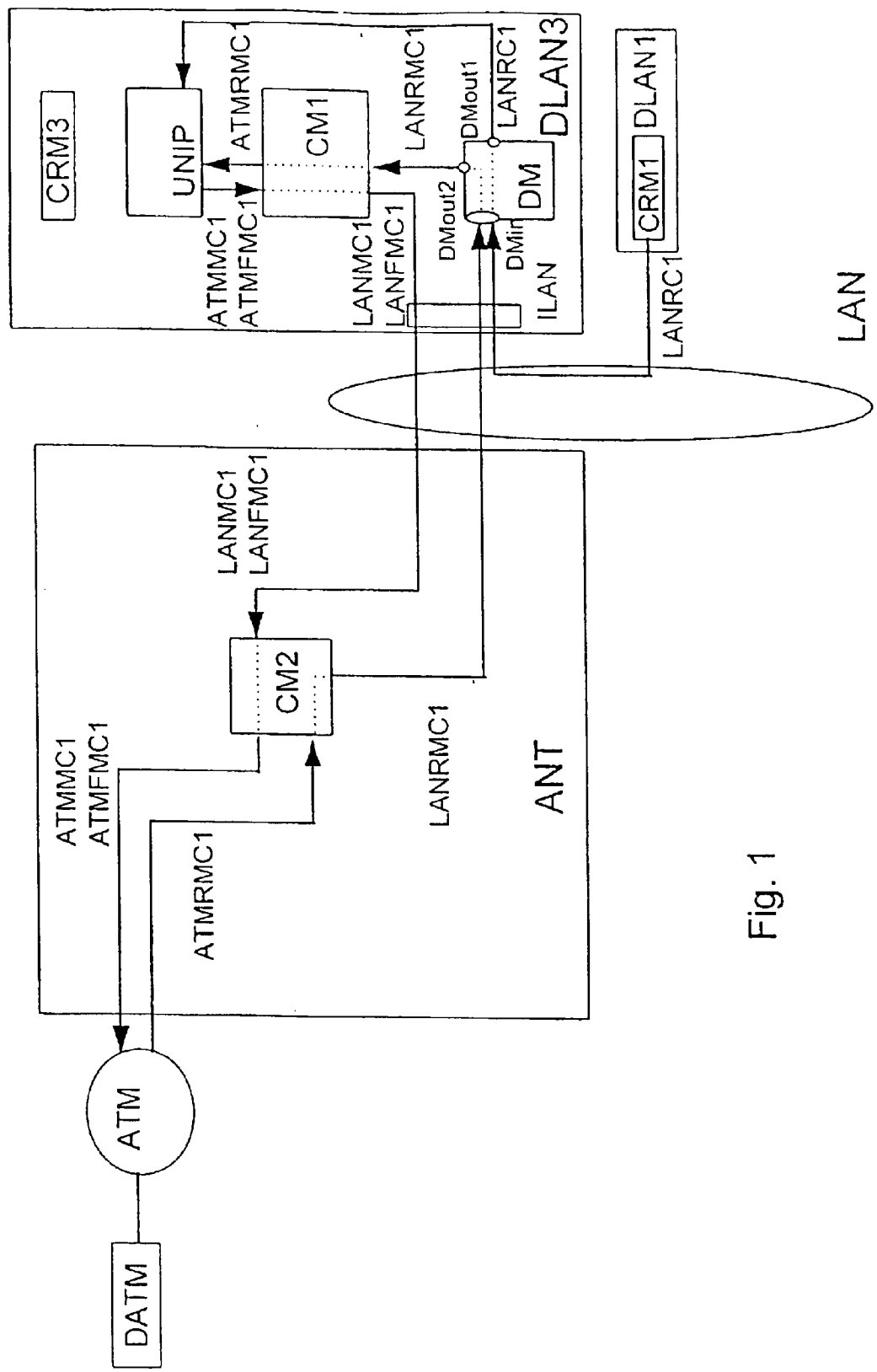
FIG. 1 schematically depicts the signals transmitted during the procedure for setting up a connection between a first terminal DLAN 1, connected to the local area network, and a second terminal DATM connected to the ATM network, the method being initiated from this first terminal connected to the local area network, FIG. 2 schematically depicts the signals transmitted during the procedure for setting up a connection between a second terminal DATM, connected to the ATM network, and a first terminal DLAN1, connected to the local area network, the method being initiated from the second terminal connected to the ATM network, FIG. 3 schematically depicts the signals transmitted during the procedure for releasing a connection between a first terminal DLAN1, connected to the local area network, and a second terminal DATM connected to the ATM network, the method being initiated from this first terminal, FIG. 4 schematically depicts the signals transmitted during the procedure for releasing a connection between a first terminal DLAN1, connected to the local area network, and a second terminal DATM connected to the ATM network, the method being initiated from the second terminal connected to the ATM network.

The present method is used for setting up or releasing a connection between a terminal connected to an ATM network and another terminal connected to a local area network. With local area network is meant, throughout this whole document, any data communication network connecting computers and/or peripherals, and on which some protocols such as Ethernet, RS232,IEEE 1394, Firewire, USB, etc. are used for enabling the different computers and equipment to internally communicate with each other.

These local area networks in general are connectionless, meaning that for data communication, no connection needs to be established before data is transmitted from one device or terminal to the other. ATM networks however are connection oriented, meaning that in case one terminal want to communicate with another one, a connection is to be established, before the data or speech can be transmitted. This establishing is performed between a terminal and the ATM network by means of a so-called ATM user-to-network-interface, abbreviated with UNI, signalling protocol, examples of them are the standard International Telecommunications Unity, abbreviated with ITU, signalling protocol Q.2931 or the ATM Forum UNI protocol version 3.0 or 3.1, 4.0 or any subsequent versions.

When such signalling messages from an ATM terminal indicate that a connection with a terminal of the local area network, hereafter abbreviated with LAN, is desired, apart from the connection from the ATM terminal to the ATM network, also a connection between the ATM network and a network termination apparatus, denoted ANT in FIGS. 1 to 4, interconnecting the ATM network, denoted by ATM, and the LAN network, denoted by LAN, is to be established. After this step data can be transmitted by the ATM terminal, denoted DATM on FIGS. 1 to 4, to any terminal of the LAN, being for instance terminal DLAN1 or DLAN3 in these same figures. During the data transmission, the ANT can further route the data towards the desired terminal of the LAN; the total operation thus seemingly resulting in a connection being set up between DATM and DLAN1 or DLAN3. Therefore, although not explicitly correct, throughout this document reference will be made to connections being established between the two terminals DATM and DLAN1 or DLAN3.

In prior art solutions, the connection between the ATM network and the ANT is established by some controller equipment within the ANT, being adapted for terminating an ATM signalling protocol. This means that this network termination apparatus, upon receipt of some ATM signalling protocol messages, transmitted by the ATM network, sent back some appropriate ATM signalling messages towards the ATM network, while during the routing, legacy LAN messages for communication with the LAN were transmitted to the LAN terminals.

For the present invention however, one predetermined terminal of this local area network, in FIGS. 1 to 4 denoted with DLAN3, is adapted to perform such ATM signalling protocol termination, by means of an ATM signalling protocol means, denoted UNIP, which is included therein. In one embodiment of this ATM signalling protocol means, this device is adapted to receive messages of such an ATM signalling protocol, acts then as a finite state machine as commonly known ATM signalling protocol termination engines, for then again transmitting appropriate next ATM messages of the ATM signalling protocol. In another embodiment, this ATM signalling protocol means can perform the same function, but based on or triggered by legacy LAN incoming messages, which are direct conversions of these ATM signalling messages of this ATM signalling protocol. Such direct conversions can be realised using for instance the cells-in-frames protocol, but other encapsulation or conversion protocols might be used as well.

In case a terminal of the local area network, for instance terminal DLAN1 on FIG. 1, wants to transmit data to a terminal connected to the ATM network, for instance terminal DATM of FIG. 1, a connection between them is to be established as well, this connection again being split up in two parts: on one hand a connection between the ATM terminal and the ATM network, on the other hand a connection between the ATM network and the network termination apparatus ANT, with a direct routing link between the network termination apparatus ANT and the terminal DLAN1 of the LAN network. The connection between the ATM network and the ANT is established by means of exchanging ATM signalling protocol messages between the ATM network and the predetermined terminal DLAN3 including the ATM signalling protocol means UNIP. The establishment or set up of the connection can occur by means of 2 variant methods. By a first variant method, terminal DLAN1 starts transmitting data which include a medium access control address of the destination ATM terminal, DATM. These data are sent towards the network termination apparatus ANT, as was done as described in the referenced prior art document. The network termination apparatus ANT includes means to analyse these incoming data (not shown in the figures), to detect therefrom that indeed a connection is desired with a terminal of the ATM network, upon which detection the network termination apparatus generates a connection set-up request. Such means is already known in the art, and is for instance also briefly referred to in the same referenced prior art patent application. In contrast to the prior art, however, the connection set-up request is now no longer internally treated in the network termination apparatus ANT itself, but is transferred towards the predetermined terminal DLAN3, which includes the ATM signalling protocol means UNIP. Since the transmission occurs over the LAN, the connection set-up request message generated by the ANT is a local area network message. The ATM signalling protocol means UNIP of the predetermined terminal DLAN3 is triggered upon receipt of this connection set-up request local area network message, and starts to transmit back an appropriate ATM signalling protocol messages, for instance a set-up message towards the ANT.

For the second variant of this method, being schematically depicted in FIG. 1, the terminal DLAN1 wanting to set up a connection with DATM, is itself now adapted for generating such a connection set-up request local area message, in FIG. 1 denoted by LANRC1, and to transmit this message towards the predetermined terminal DLAN3. Both actions are performed by means of a first connection request means denoted CRM1 in FIG. 1, and included in DLAN1. Upon receipt of this connection request message LANRC1 by the ATM signalling protocol means UNIP, the latter device will generate and transmit again an appropriate ATM signalling protocol message, denoted ATMMC1 in FIG. 1, towards the ANT. Before this ATM message is transmitted over the LAN, it first has to be translated or transparently converted, from ATM to a local area network protocol such as for instance Ethernet. This conversion takes place within a first conversion device included within the predetermined terminal DLAN3 and in FIG. 1 denoted with CM1. The conversion scheme may for instance consist of the already mentioned the cells-in-frames method. Message ATMMC1 of FIG. 1 is thus converted into a corresponding LAN message LANMC1, which is subsequently delivered via a LAN interface means ILAN of the predetermined terminal, over the LAN, to the network termination apparatus ANT. Since this local area network message LANMC1 is intended for the ATM network, it has to be reconverted again into the original ATM message ATMMC1. This is performed by a second conversion device CM2 included in the network termination apparatus ANT, which then further forwards the original re-converted message ATMMC1 towards the ATM network ATM. This network in its turn on one hand generates the appropriate signalling messages (not shown in FIG. 1), towards the ATM terminal DATM and on the other hand responds to the ANT by transmitting a returning message of this ATM signalling protocol, for instance a call proceeding message. The returning ATM signalling message then follows the opposite way through the second conversion device CM2, getting converted into a returning local area network message, for transmission over the LAN, towards the predetermined terminal DLAN3. This is again schematically depicted in FIG.1 whereby this returning ATM message is denoted ATMRMC1, its converted corresponding LAN returning message denoted LANRMC1.

Upon arrival of this corresponding local area network returning message LANRMC1 at the LAN interface means ILAN of the predetermined terminal DLAN3, in one variant of the method and of the embodiment of the predetermined terminal, not depicted in FIG. 1, this message will be directly transmitted towards the ATM signalling protocol means, which is adapted to recognise and interpret this message, and to further transmit a following message of the ATM signalling protocol. In another variant of the method and of the embodiment which is depicted in FIG. 1, the incoming LAN returning message LANRMC1, consisting of a converted ATM signalling protocol message, is first re-converted within the first conversion means CM1, into the original ATM returning message of the ATM signalling protocol ATMRMC1, for delivery to the UNIP. In this case, a device is included in the predetermined terminal, which is adapted to distinguish amongst incoming LAN messages to the LAN interface means ILAN, which messages have to be forwarded to the first conversion means CM1, and which messages, such as for instance the connection set-up request local area network message LANRC1, can be transmitted directly towards the ATM signalling protocol means. This device is a demultiplexer means, denoted by DM, which includes an incoming terminal DMin, coupled to the LAN interface means ILAN, and which includes a first output terminal, DMout1, coupled to the ATM signalling protocol means UNIP, and a second output terminal DMout2, coupled to the first conversion means CM1. The demultiplexer means DM is using existing identification mechanisms that exist in the protocol that converts the ATM cells into the LAN frames, such as for instance the CIF protocol. Such a demultiplexer means is commonly known by a person skilled in the art and will therefore not be further described.

It is to be remarked that this device is not required in case the converted ATM signalling messages, such as LANRMC1, are directly transmitted towards UNIP, such as by the already mentioned variant of the method, or in case the requests for setting up a connection, such as LANRC1, should also first be converted into an ATM message by the first conversion means CM1.

Upon receipt of the original returning ATM signalling protocol message ATMRMC1 by the ATM signalling protocol means UNIP, the latter device then responds by transmitting a following ATM message of this signalling protocol, denoted by ATMFMC1 in FIG. 1, which is in principle treated the same way as the ATMMC1 message, thus first converted into a corresponding following local area message LANFMC1, transmitted via the LAN interface means over the local area network to the network termination apparatus ANT, the second conversion device CM2 of which again reconverts this corresponding following LAN message into the original following ATM message of the ATM signalling protocol for setting up the connection, ATMFMC1. The ATM network in its turn will then again respond by transmitting an appropriate returning message, etc., which is not shown anymore in order not to overload the drawing. At the end, when the final ATM signalling message, such as for instance a connection acknowledge message is transmitted by the UNIP, the connection between DLAN1 and DATM is established.

In case DLAN3 itself wants to set up a connection between itself and DATM, either the first variant of the method, as was already explained for the first terminal DLAN1, is used, whereby DLAN3 just starts to transmit data over the LAN to the network termination apparatus ANT. The latter device includes means to recognise that these data of DLAN3 are meant for transmission to DATM, to further generate a connection set-up request local area network message for setting up a connection between DLAN3 and DATM, and to transmit this connection set-up request local area network message to the ATM signalling protocol means of DLAN3. By the second variant of the method, DLAN 3 includes itself a third connection request means CRM3, adapted to generate a request for setting up a connection between itself and DATM, and to transmit this request towards the ATM signalling protocol means UNIP. Remark that in this case this connection set-up request is an internal signal within the terminal DLAN3, and consequently, does not have to be a local area network message since no transmission over the LAN is required.

Figure 3:
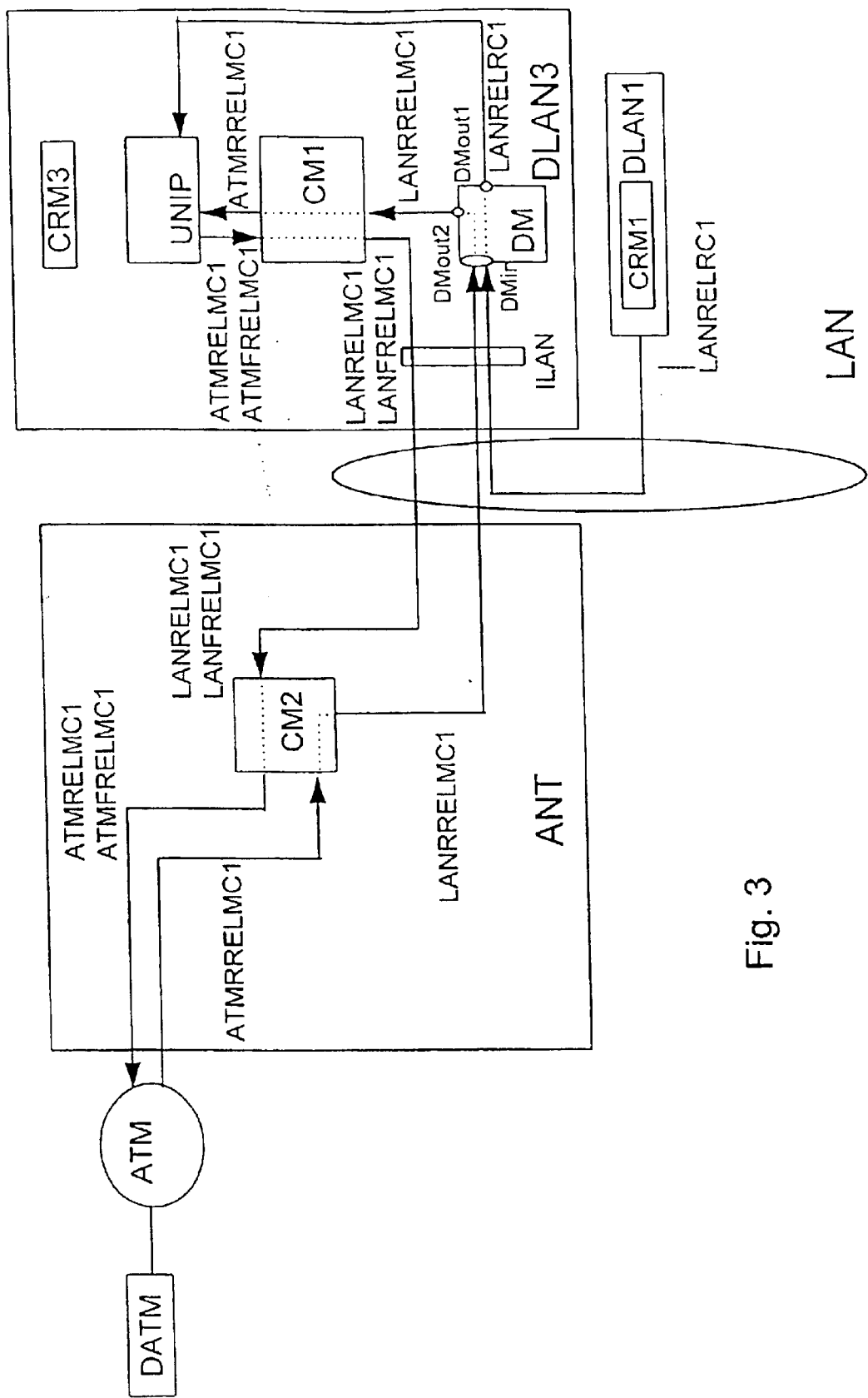
Figure 4:
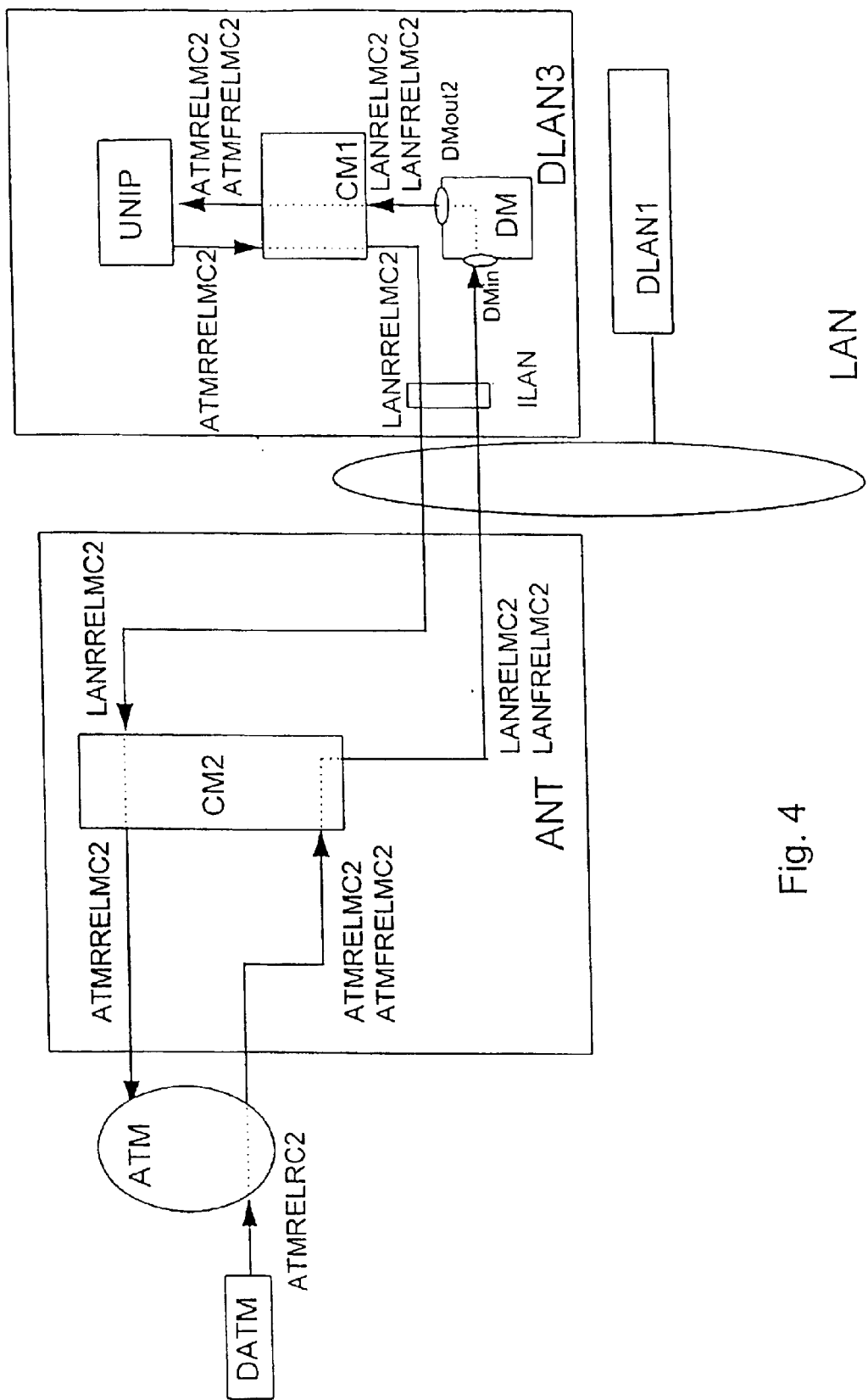

In case when DLAN1 wants to clear an already established connection between itself and an ATM terminal DATM, again two variants of the method are possible : on one hand, the ANT itself, determines that the connection is to be released, for instance by observing that for a predetermined amount of time, no data is transmitted anymore over this connection. The ANT then is adapted to generate a connection set-up request local area network message for releasing the connection, and to transmit this request to the predetermined terminal DLAN3. By the second variant method, as depicted in FIG. 3, DLAN1 itself generates a connection set-up request local area network message for clearing or releasing the connection, in FIG. 3 denoted by LANRELRC1, by means of the first connection request means CRM1, which is further adapted to transmit this LAN message LANRELRC1, over the LAN, towards the predetermined terminal DLAN3. This connection release request local area network message is treated within DLAN 3 in a similar way as the connection set-up request local area message LANRC1 shown in FIG. 1 and described in a previous paragraph for setting up the connection: it is first received by the LAN interface means ILAN, and forwarded to the demultiplexer means DM. Therein, it is recognised as a release request message and consequently forwarded via the first output terminal DMout1 of this demultiplexer means, to the ATM signalling protocol means UNIP. The latter device, upon receipt of this connection release request local area network message, generates an appropriate ATM message of the ATM signalling protocol, for releasing this connection. This latter ATM message is denoted ATMRELMC1, and is transferred by the UNIP towards the first conversion means CM1, which is adapted to convert this ATM signalling protocol message into a corresponding local area network message LANRELMC1, and to forward this LAN message, via the LAN interface means ILAN and the LAN itself, towards the network termination apparatus ANT. Therein this LAN message is again converted by the second conversion means CM2 into the original ATM signalling protocol message ATMRELMC1, for further forwarding to the ATM network. This ATM network responds by transmitting on one hand ATM signalling messages DATM (these ATM signalling messages are not shown on FIG. 3) towards the ATM terminal, and on the other hand a returning message of the ATM signalling protocol for releasing the connection is transmitted towards the network termination apparatus ANT. The ATM returning message is denoted ATMRRELMC1. Within this network termination apparatus, this returning ATM signalling protocol message is again converted into a corresponding LAN returning message, denoted LANRRELMC1, for further transmission over the LAN, towards the predetermined terminal DLAN3. Therein the returning LAN message is received by the LAN interface means ILAN, which forwards this message to the input terminal DMin of the demultiplexer means DM. This device is adapted to recognise this returning local area network message LANRRELMC1 as being a converted ATM message of an ATM signalling protocol, and consequently delivers this LAN returning message LANRRELMC1 it to its second output terminal DMout2, which is coupled to the first conversion device CM1. The LAN message is consecutively reconverted into the original ATM signalling message ATMRRELMC1, for delivery to the ATM signalling protocol means UNIP. Again, upon receipt of this ATM returning message, the UNIP responds by transmitting a following message of the ATM signalling protocol for releasing the connection, in FIG. 3 denoted ATMFRELMC1. This ATM message is treated similar as ATMRELMC1, namely first converted within CM1 into a corresponding following local area network message LANFRELMC1, transmitted via ILAN over the LAN towards the CM2 of the ANT, which converts this LAN message again to the original ATM following message of the ATM signalling protocol for releasing the connection, ATMFRELMC1. The same steps as already described are repeated until the connection is completely released.

For the predetermined terminal wanting to release an existing connection between itself and a terminal of the ATM network, the same variant methods as described for an arbitrary terminal DLAN1, are used and will consequently not be repeated in this document. The device adapted for generating a connection release request message, used by a second variant method, is denoted CRM3.

Figure 2:
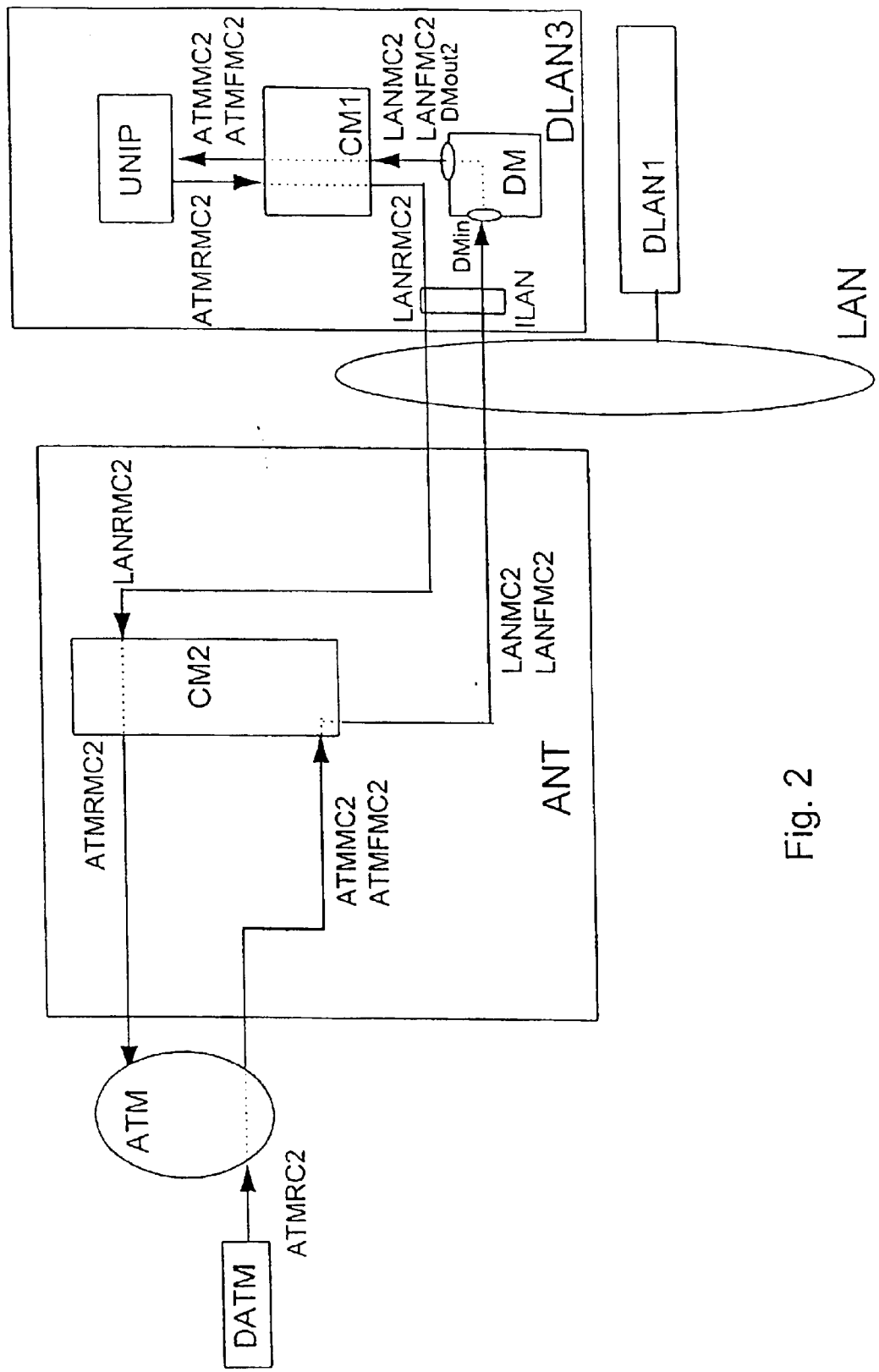

In another case, where as depicted in FIG. 2, an ATM terminal DATM wants to set up a connection to a terminal DLAN1 connected to the LAN, the ATM terminal transmits an ATM connection set-up request message ATMRC2, this message already pertaining to an ATM signalling protocol, to the ATM network ATM. This ATM network, besides transmitting back appropriate signalling messages (not shown on FIG. 2) to the ATM terminal, further tries to establish the connection with the ANT, which will afterwards further perform the routing to DLAN1. The connection between the ATM network and the ANT is set up by the ATM network transmitting ATM signalling protocol messages towards the network termination apparatus ANT. Such a signalling message is denoted ATMMC2 in FIG. 2, and is transparently converted to a LAN message therein by means of the second conversion device CM2, using the same conversion or encapsulation protocol. The second conversion device further transmits the converted message over the LAN towards the predetermined terminal DLAN3.

Upon arrival at the LAN interface means ILAN of the predetermined terminal, the LAN message is either directly transmitted towards the UNIP of DLAN3, or either first distinguished and separated from other LAN incoming messages, within a demultiplexer means DM, if this latter device is included in the predetermined terminal, for transmission towards the first conversion means CM1. Remark that indeed for this method, the demultiplexer means is not strictly required, since either all incoming LAN messages to DLAN3 are to be converted within CM1, or are either directly transmitted towards UNIP. Since however, for the already described method whereby a connection is set up upon request of DLAN1, some variants required such a demultiplexing device to be included in DLAN3, allowing to make a distinction incoming LAN messages to this predetermined terminal.

For these embodiments of DLAN3 that include such a demultiplexer means DM, all incoming LAN messages, including LANMC2, received via the LAN interface means ILAN, at the input terminal DMin of DM, are separated into two groups, the converted ATM signalling messages of which are transmitted via the second output terminal DMout2 of the demultiplexer means DM, towards the first conversion means CM1. LANMC2 is further re-converted into the original ATM signalling protocol message ATMMC2, by means of the first conversion device CM1, and delivered to the ATM signalling protocol means UNIP. The latter device is adapted to transmit, upon receipt of ATMMC2, a returning ATM signalling protocol message, denoted by ATMRMC2, which is first converted into a corresponding local area network message, LANRMC2, transmitted via the LAN interface means ILAN, over the LAN, towards the network termination apparatus ANT. The second conversion device CM2 of the ANT re-converts the corresponding LAN message LANRMC2 into the original returning ATM signalling protocol message ATMRMC2, for delivery to the ATM network. The latter will again, in its turn then respond by transmitting another following ATM signalling protocol message, ATMFMC2 towards the ANT, the second conversion means CM2 of which again converts this following ATM signalling protocol message into a corresponding following local area network message, LANFMC2, which is, again re-converted within the first conversion means CM1 into the original following ATM signalling protocol message for setting up the connection. These steps are repeated, until the connection between the ATM network and the ANT is established, after which step the data can be appropriately routed towards DLAN1 by means of some routing algorithm, which is however beyond the scope of the invention.

For setting up a connection from DATM to DLAN3, principally the same steps are to be repeated as for the connection between DATM and DLAN1, the only difference being the routing, which is for instance based upon the medium access control address of both terminals, used during the routing step for discrimination both terminals form each other.

If the ATM terminal DATM, wants to release an already established connection between itself and a terminal at the LAN-side, for instance DLAN1 or DLAN3, apart from the connection between DATM and the ATM network, also the connection between the ATM network and the ANT has to be cleared or released. The ATM terminal DATM starts the procedure by transmitting a request for releasing or clearing the connection between itself and the LAN terminal, by means of a request for release message, in FIG. 4 denoted by ATMRELRC2. This message is transmitted by DATM towards the ATM network, after which appropriate ATM signalling messages are again generated by the ATM network, for transmission towards the ATM terminal DATM (these messages are not shown in FIG. 4) whereas an other message is generated for transmission towards the ANT, the latter message being denoted by ATMRELMC2. This message is also first converted within the second conversion device of the ANT into a corresponding LAN message, denoted LANRELMC2, for transmission over the LAN, towards the predetermined terminal DLAN3. The latter receives the LAN message at its LAN interface means ILAN, and either directly transmits it to the ATM signalling protocol means UNIP, or first converts it into the original ATM message within its first conversion device CM1. In case, as also been described previously, a demultiplexer means DM should be present in this predetermined terminal, the LAN message LANRELMC2 is first received at the input terminal DMin of DM, and DM is adapted to distinguish LANRELMC2 from other LAN messages, as being a converted ATM signalling protocol message, for further transmission via its second output terminal DMout2 to the first conversion device CM1. Therein, the LANRELMC2 message is re-converted to the original ATM signalling message ATMRELMC2, and delivered to the ATM signalling protocol means UNIP. The latter device, upon receipt of this message, generates a returning message of this ATM signalling protocol for releasing the connection, this returning message being denoted by ATMRRELMC2. This message is again converted in the first conversion means into a corresponding LAN message denoted LANRRELMC2, for transmission via the LAN interface means ILAN, over the LAN, towards the ANT. The latter again re-converts LANRRELMC2 into the original ATM signalling protocol message ATMRRELMC2, for delivery to the ATM network, after which the whole cycle eventually can start again with a following ATM message of this ATM signalling protocol for releasing the connection, denoted ATMFRELMC2: ATMFRELMC2 is converted into LANFRELMC2 by the second conversion means, transmitted over the LAN to DLAN3, delivered via DMout2 of DM to CM1 which re-converts LANFRELMC2 into the original ATM-FRELMC2. These steps are then further repeated until the connection is completely released.

Remark that for all described cases the second conversion means CM2 of the network termination apparatus merely acts as a selection, conversion and transmission device, in both directions. For messages received from either the ATM or the LAN side, ATM signalling protocol messages or converted ATM signalling protocol messages are distinguished from other ones, for being transparently converted into corresponding LAN or ATM messages, for delivery to either the predetermined terminal or the ATM network. Compared to the prior art situation, this represents few added functionality, since the conversion between the ATM and the LAN protocol functionality was already incorporated into the ANT in prior art embodiments. A person skilled in the art is able to perform the above described additional functional steps, which are in general realised as software instructions. Since this represents common knowledge at the time of the invention, this will not be further described into detail.

While the principles of the invention have been described above in connection with specific apparatus, it is to be clearly understood that this description is made only by way of example and not as a limitation on the scope of the invention, as defined in the appended claims.

What is claimed is:

1. A method for setting up or releasing a connection between a first terminal connected to a local area network and a second terminal connected to an ATM network, said ATM network and said local area network each coupled to a network termination apparatus, said method comprises generating by said network termination apparatus a connection set-up request, or a respective connection release request message for requesting to set up, or to release, said connection, wherein:

said connection set-up request, or said connection release request message is a local area network message, which is transmitted via said local area network towards a predetermined terminal connected to said local area network and adapted to terminate an ATM signaling protocol, whereby upon receipt of said connection set-up request, or said connection release request message by said predetermined terminal, at least one ATM message of said ATM signaling protocol for setting up, or releasing said connection, is generated and transmitted from said predetermined terminal to said ATM network via said local area network coupled to said network termination apparatus.

2. A method for setting up or releasing a connection between a first terminal connected to a local area network and a second terminal connected to an ATM network, said ATM network and said local area network each being coupled to a network termination apparatus, said method comprises generating a connection set-up request, or a connection release request message for requesting to set up, or release, said connection, wherein:

said connection set-up request, or said connection release request message is a local area network message which is generated by said first terminal, whereby said connection set-up request, or said connection release request message is transmitted towards a predetermined terminal connected to said local area network and adapted to terminate an ATM signaling protocol, and whereby upon receipt of said connection set-up request, or said connection release request message by said predetermined terminal, at least one ATM message of said ATM signaling protocol for setting up, or releasing said connection, is generated and transmitted from said predetermined terminal to said ATM network via said local area network coupled to said network termination apparatus.

3. The method according to claim 1, wherein said first terminal is said predetermined terminal.

4. The method according to claim 1, wherein said at least one ATM message for setting up, or for releasing said connection, is first converted by said predetermined terminal into at least one corresponding local area network message for setting up, or for releasing said connection, for further transmission to said network termination apparatus, whereby said at least one corresponding local area network message for setting up, or for releasing said connection, is further reconverted by said network termination apparatus into said at least one ATM message of said ATM signaling protocol for setting up, or for releasing said connection, for further transmission to said ATM network.

5. The method according to claim 4, wherein at least one ATM returning message of said ATM signaling protocol for setting up, or for releasing said connection, is transmitted from said ATM network to said network termination apparatus, whereby said at least one ATM returning message for setting up, or for releasing said connection, is first converted within said network termination apparatus into at least one corresponding local area network returning message for setting up, or for releasing said connection, for further transmission to said predetermined terminal.

6. The method according to claim 5, wherein said at least one corresponding local area network returning message for setting up, or for releasing said connection, is further reconverted within said predetermined terminal into said at least one ATM returning message of said ATM signaling protocol for setting up, or releasing said connection.

7. The method according to claim 5, wherein
upon receipt of said at least one corresponding local area network returning message for setting up, or for releasing said connection, by said predetermined terminal, at least one following ATM message of said ATM signaling protocol for setting up, or releasing said connection is generated and transmitted from said predetermined terminal to said ATM network, whereby
said at least one following ATM message for setting up, or for releasing said connection, is first converted by said predetermined terminal into at least one following corresponding local area network message for setting up, or for releasing said connection, for further transmission to said network termination apparatus; and whereby
said at least one following corresponding local area network message for setting up, or for releasing said connection, is further reconverted by said network termination apparatus into said at least one following ATM message of said ATM signaling protocol for setting up, or for releasing said connection, for further transmission to said ATM network.

8. A method for setting up, or releasing a connection between a first terminal connected to a local area network and a second terminal connected to an ATM network, said ATM network and said local area network each being coupled to a network termination apparatus, said method comprises transmitting from said second terminal towards said ATM network a request for setting up, or releasing said connection, said method further comprises transmitting from said ATM network to said network termination apparatus, at least one ATM message of an ATM signaling protocol for setting up, or releasing, said connection, wherein:
said at least one ATM message of said ATM signaling protocol for setting up, or releasing said connection, is converted within said network termination apparatus into at least one corresponding local area network message for setting up, or releasing said connection, for further transmission from said network termination apparatus via said local area network towards a predetermined terminal connected to said local area network and adapted to terminate said ATM signaling protocol,
whereby upon receipt of said at least one corresponding local area network message for setting up, or releasing, said connection, by said predetermined terminal, at least one returning ATM message of said ATM signaling protocol for setting up, or releasing, said connection is generated by and transmitted from said predetermined terminal to said ATM network, via said local area network to said network termination apparatus.

9. The method according to claim 8, wherein said first terminal is said predetermined terminal.

10. The method according to claim 8, wherein said at least one corresponding local area network message for setting up, or releasing said connection is further reconverted within said predetermined terminal into said at least one ATM message for setting up, or releasing said connection.

11. The method according to claim 8, wherein
said at least one returning ATM message for setting up, or releasing, said connection, is first converted by said predetermined terminal into at least one corresponding returning local area network message for setting up, or releasing, said connection, for further transmission to said network termination apparatus,
whereby said at least one corresponding returning local area network message for setting up or releasing said connection, is further reconverted by said network termination apparatus into said at least one returning ATM message of said ATM signaling protocol for setting up, or releasing said connection, for further transmission to said ATM network.

12. The method according to claim 11, wherein
upon receipt of said at least one ATM returning message for setting up, or for releasing said connection, by said ATM network, at least one following ATM message of said ATM signaling protocol for setting up, or releasing said connection is generated by and transmitted from said ATM network towards said network termination apparatus, whereby:
said at least one following ATM message of said ATM signaling protocol for setting up, or releasing said connection, is converted within said network termination apparatus into at least one following corresponding local area network message for setting up, or releasing said connection, for further transmission from said network termination apparatus towards a predetermined terminal connected to said local area network and adapted to terminate said ATM signaling protocol,
whereby upon receipt of said at least one following corresponding local area network message for setting up, or releasing, said connection, by said predetermined terminal, at least one next returning ATM message of said ATM signaling protocol for setting up, or releasing, said connection is generated by and transmitted from said predetermined terminal to said ATM network, via said network termination apparatus.

13. A first terminal that is connected to a local area network, said local area network and an ATM network each being coupled to a network termination apparatus, wherein said first terminal comprises first connection request means, adapted to generate a connection set-up request or a connection release request local area network message for requesting to set up, or to release, a connection between said first terminal and a second terminal connected to said ATM network, said first terminal being further adapted to transmit said connection set-up request, or said connection release request, local area network message to a predetermined terminal connected to said local area network, wherein, upon receipt of a connection set-up request local area network message or upon receipt of a connection release request local area network message, said predetermined terminal generates and transmits at least one ATM message of an ATM signaling protocol for setting up, or for releasing, said connection to said network termination apparatus via said local area network.

14. A predetermined terminal that is connected to a local area network via a local area network interface means included within said predetermined terminal, said local area network and an ATM network each being coupled to a network termination apparatus, wherein said predetermined terminal further comprises ATM signaling protocol means adapted to terminate an ATM signaling protocol received over said local area network, wherein said predetermined terminal further comprises demultiplexer means having an input terminal coupled to said local area network interface means, said demultiplexer means comprising a first demultiplexer means output terminal coupled to said ATM signaling protocol means, said demultiplexer means being adapted to distinguish, from incoming local area network messages received at said input terminal, at least one connection set-up request or at least one connection release request local area network message, for requesting to set up, or to release a connection between a first terminal connected to said local area network and a second terminal connected to said ATM network, said demultiplexer means further being adapted to forward said at least one connection set-up request, or said at least one connection release request message, via said first output terminal of said demultiplexer means, to said ATM signaling protocol means.

15. The predetermined terminal according to claim 14, wherein said ATM signaling protocol means is further adapted to, upon receipt of a connection set-up request local area network message or upon receipt of a connection release request local area network message, for setting up, or for releasing, a connection between a first terminal connected to a local area network, and a second terminal connected to an ATM network, to generate and transmit at least one ATM message of said ATM signaling protocol for setting up, or for releasing, said connection.

16. The predetermined terminal according to claim 14, wherein said predetermined terminal further comprises third connection request means coupled to said ATM signaling protocol means and adapted to generate a connection set-up request message or a connection release request message, for requesting to set up, or to release, a connection between said predetermined terminal and a second terminal connected to an ATM network, said ATM signaling protocol means thereby being adapted to generate and transmit at least one ATM message of said ATM signaling protocol for setting up, or for releasing, said connection, upon receipt of said connection set-up request message or said connection release request message.

17. The predetermined terminal according to claim 14, wherein said ATM signaling protocol means is further adapted to generate, upon receipt of at least one corresponding local area network message being at least one converted ATM message of said ATM signaling protocol for setting up, or for releasing a connection between a first terminal connected to said local area network and a second terminal connected to said ATM network, at least one next ATM message of said ATM signaling protocol for setting up, or for releasing said connection.

18. The predetermined terminal according to claim 14, wherein said ATM signaling protocol means is further adapted to generate, upon receipt of at least one ATM message of said ATM signaling protocol for setting up, or for releasing a connection between a first terminal connected to said local area network and a second terminal connected to said ATM network, at least one next ATM message of said ATM signaling protocol for setting up, or for releasing said connection.

19. The predetermined terminal according to claim 14, wherein said predetermined terminal comprises first conversion means coupled between said ATM signaling protocol means, and said local area network interface means, and adapted to receive and to convert at least one ATM message generated by said ATM signaling protocol means, to at least one corresponding local area network message, for further transmission via said local area network interface means to said network termination means.

20. The predetermined terminal according to claim 19, wherein said first conversion means is further adapted to convert local area network messages received from said local area network interface means into corresponding ATM messages for delivery to said ATM signaling protocol means.

21. The predetermined terminal according to claim 14, wherein said demultiplexer means further comprises a second output terminal which is coupled to said first conversion means, said demultiplexer means is further adapted to distinguish, from incoming local area network message messages, received at said input terminal, at least one local area network message being at least one converted message of at least one message of said ATM signaling protocol for setting up, or releasing a connection between a first terminal connected to said local area network and a second terminal connected to said ATM network, said demultiplexer means further being adapted to forward said at least one local area network message via said second output terminal of said demultiplexer means to said first conversion means, whereby said first conversion means is further adapted to re-convert said at least one local area network message received from said second output terminal of said demultiplexer means into said at least one ATM message of said ATM protocol, for setting up, or for releasing said connection, for further delivery to said ATM signaling protocol means.

22. A network termination apparatus for being coupled between a local area network and an ATM network, said network termination apparatus comprising conversion means adapted to convert back and forth between local area network messages and ATM messages, said network termination arrangement further comprising means adapted to analyze successive incoming data packets transmitted from at least one terminal connected to said local area network, to detect therefrom whether a connection between said at least one terminal and a second terminal connected to said ATM network is to be set up or to be released, and to generate, depending on the result of said detection, a connection set-up request or a connection release request message requesting to set up, or to release said connection, wherein said connection set-up request, or said connection release request message, is a local area network message, whereby said means is further adapted to transmit said connection set-up request, or said connection release request message via said local area network towards a predetermined terminal connected to said local area network and adapted to terminate an ATM signaling protocol.

23. The network termination apparatus according to claim 22, wherein said at least one terminal connected to said local area network corresponds to said predetermined terminal.

24. A network termination apparatus coupled between a local area network and an ATM network, said network termination apparatus comprising conversion means adapted to convert back and forth between local area network messages and ATM messages, said conversion means further being adapted to distinguish amongst incoming ATM messages, at least one ATM message generated by an ATM network, of an ATM signaling protocol for setting up, or releasing a connection between a first terminal connected to said local area network and a second terminal connected to said ATM network, wherein said conversion means is further adapted to convert said at least one ATM message of said ATM signaling protocol for setting up, or releasing said connection, into at least one corresponding local area network message for setting up, or releasing said connection, for further forwarding via said local area network to a predetermined terminal connected to said local area network, and which is adapted to terminate an ATM signaling protocol.

25. The network termination apparatus according to claim 24, wherein said first terminal corresponds to said predetermined terminal.

26. A network termination apparatus for being coupled between a local area network and an ATM network, said ATM network termination apparatus comprising conversion means adapted to convert back and forth between local area network messages and ATM messages, said network termination arrangement further including means adapted to analyze successive incoming data packets transmitted from at least one terminal connected to said local area network, to detect therefrom whether a connection between said at least one terminal and a second terminal connected to said ATM network is to be set up or released, and to generate, depending on the result of said detection, a connection set-up request or a respective connection release request message requesting to set up or respectively release said connection, wherein said connection set-up request connection release request message is a local area network message, whereby said means is further adapted to transmit said connection set-up request or connection release request message via said local area network towards a predetermined terminal connected to said local area network and adapted to terminate an ATM signaling protocol;

said conversion means is further adapted to distinguish amongst incoming local area network messages, at least one local area network message being at least one converted message of an ATM signaling protocol for setting up or releasing a connection between said one terminal and said second terminal, to reconvert said at least one local network message into at least one ATM message of said ATM signaling protocol for setting up or releasing said connection, for further forwarding to said ATM network; and said conversion means is further adapted to convert said at least one ATM message of said ATM signaling protocol into at least one corresponding local area network message for setting up or releasing said connection, for further forwarding via said local area network to a predetermined terminal connected to said local area network, and which is adapted to terminate an ATM signaling protocol.

* * * * *